US010196946B2

(12) United States Patent
Maas

(10) Patent No.: US 10,196,946 B2
(45) Date of Patent: Feb. 5, 2019

(54) CHECK VALVE WITH ANTI-ICING PROTECTION

(71) Applicant: Eichenauer Heizelemente GmbH & Co. KG, Kandel (DE)

(72) Inventor: Andreas Maas, Offenbach (DE)

(73) Assignee: EICHENAUER HEIZELEMENTE GMBH & CO. KG, Kandel (DE)

( * ) Notice: Subject to any disclaimer, the term of this patent is extended or adjusted under 35 U.S.C. 154(b) by 0 days.

(21) Appl. No.: 15/883,844

(22) Filed: Jan. 30, 2018

(65) Prior Publication Data

US 2018/0216506 A1 Aug. 2, 2018

(30) Foreign Application Priority Data

Feb. 2, 2017 (DE) .......................... 10 2017 102 075

(51) Int. Cl.
*F01M 13/00* (2006.01)
*F16K 49/00* (2006.01)
(Continued)

(52) U.S. Cl.
CPC ........ *F01M 13/0011* (2013.01); *F01M 13/00* (2013.01); *F02M 25/06* (2013.01); *F02M 35/10222* (2013.01); *F16K 15/02* (2013.01); *F16K 15/026* (2013.01); *F16K 49/00* (2013.01); *F16K 49/002* (2013.01); *F01M 2013/0027* (2013.01); *Y02T 10/121* (2013.01)

(58) Field of Classification Search
CPC ............... F01M 13/0011; F01M 13/00; F01M 2013/0027; F02M 25/06; F02M 35/10222; F16K 49/002; F16K 19/00; F16K 15/02; F16K 15/026; F16K 15/03; F16K 15/031; F16K 15/033
See application file for complete search history.

(56) References Cited

U.S. PATENT DOCUMENTS 4,013,089 A    3/1977   Braukmann
7,387,114 B2 *   6/2008   Gschwind .............. F01M 13/00
                                                                                                         123/573
(Continued)

FOREIGN PATENT DOCUMENTS

DE          1500127 A1    4/1969
DE          2659158 A1   12/1976
(Continued)

*Primary Examiner* — Grant Moubry
(74) *Attorney, Agent, or Firm* — Bose McKinney & Evans LLP

(57) ABSTRACT

A check valve is described for a gas-carrying line in a motor vehicle, in particular for the venting of a crankcase, having a valve housing which has a valve seat, a valve disk which abuts against the valve seat in a closed position and an electric heating device for heating the valve housing, wherein the valve disk is integrally configured with a spring and fastening section that is fixed to the valve housing and generates a closing force that presses the valve disk against the valve seat, and wherein the valve housing has a metal body, which forms the valve seat and on its outside forms a thermal coupling surface, on which the electric heating device sits and which extends together with the electric heating device beyond the valve seat both in the flow direction and in the opposite direction.

10 Claims, 4 Drawing Sheets

(51) Int. Cl.
*F16K 15/02* (2006.01)
*F02M 35/10* (2006.01)
*F02M 25/06* (2016.01)

(56) References Cited

U.S. PATENT DOCUMENTS

| | | | | |
|---|---|---|---|---|
| 9,027,537 | B2* | 5/2015 | Shirabe | F01M 5/002 |
| | | | | 123/574 |
| 10,006,325 | B2* | 6/2018 | Okazaki | F01M 13/0011 |
| 2008/0099000 | A1* | 5/2008 | Suzuki | F01M 13/0011 |
| | | | | 123/574 |
| 2015/0139632 | A1* | 5/2015 | Mueller | F01M 13/00 |
| | | | | 392/480 |
| 2018/0216508 | A1* | 8/2018 | Brinker | F01M 13/04 |

FOREIGN PATENT DOCUMENTS

| | | |
|---|---|---|
| DE | 3816174 A1 | 11/1989 |
| DE | 4025732 A1 | 2/1992 |
| DE | 102012108013 A1 | 3/2014 |

* cited by examiner

CHECK VALVE WITH ANTI-ICING PROTECTION

RELATED APPLICATIONS

This application claims priority to DE 10 2017 102 075.6, filed Feb. 2, 2017, the entire disclosure of which is hereby incorporated herein by reference in its entirety.

BACKGROUND

This disclosure relates to a check valve having anti-icing protection. Such valves are used in lines for gaseous fluids when icing due to low ambient or fluid temperatures is to be feared. In particular, such valves are used in exhaust gas recirculation lines and for the venting of crankcases in motor vehicles, where water can condense and freeze in the fluid lines, the valve bodies and the valve seats. The icing can then lead to a restriction of the function of the crankcase ventilation.

Separately heated check valves are known, for example from DE 10 2012 108 013 A1, which are arranged at the end of a blow-by line and are thereby heated via heat-conducting components, in particular, a good heat-conducting pipeline wall, by means of the heating of the blow-by line. The disadvantage here is high installation costs and complex valve technology.

SUMMARY

This disclosure provides a valve design that is safely protected against icing with little effort.

A check valve according to this disclosure has a valve disk that comprises a spring and fastening section which is fastened to the valve housing and generates a closing force which presses the valve disk against a valve seat. The valve disk including spring and fastening section is a single piece and can be inexpensively cut out of a metal sheet. Advantageously, a valve according to this disclosure is thus configured particularly simple, has low mass and is easily integrated into a heated line section.

The valve housing of a check valve according to this disclosure has a metal body which forms the valve seat and forms on its outside a thermal coupling surface on which an electric heating device sits. The thermal coupling surface and the heating device extend together with the electric heating device beyond the valve seat both in the flow direction and in the opposite direction. Heat generated by the heating device is thus introduced via the coupling surface into the metal body and fed to the valve seat and the valve disk. The metal body can, for example, be made of an aluminum-based alloy and thus have a very good heat conduction.

The electric heating device may comprise one or more ceramic PTC heating resistors, for example, in the form of a plate. The PTC heating resistor preferably extends beyond the valve seat both in the flow direction and in the opposite direction.

The thermal coupling surface is preferably configured planar. A particularly good thermal coupling of the metal body to the heating device can be achieved in this way. The electric heating device may have one or two contact plates in addition to one or more ceramic PTC heating resistors. The contact plate(s) electrically contact the heating resistors. When the heating device has two contact plates, the PTC heating resistor is arranged between the two contact plates. One of the two contact plates is then located between the thermal coupling surface and the PTC heating resistor or the PTC heating resistors. If the heating device has only one contact plate, the metal body can be used for electrically contacting the PTC heating resistor or the PTC heating resistors. The heating device may additionally have a plastic frame that holds the one or more PTC heating resistors and the one or more contact plates.

In some embodiments of a check valve according to this disclosure, the valve disk, or more precisely its spring and fastening section, is not fastened along the entire inner circumference of the valve housing to the valve housing, but only along a portion of the circumference, which may account for less than 1/10 of the total circumference. For example, the spring and fastening section can be fastened to the valve housing with two rivets which are arranged side by side. It is also possible that the spring and fastening section is fastened along two circumferential sections of the valve housing, between each of which is a distance, for example, by means of two rivets opposing each other.

An advantageous refinement of this disclosure provides that the spring and fastening section surrounds the valve disk. Preferably, the spring and fastening section consists of two C-shaped regions which surround the valve disk. The two C-shaped regions may together completely surround the valve disk or might be arranged at one or both ends at a distance from each other. Such a distance may be less than 1/10 of the circumference, for example not more than 1/20 of the circumference. It is possible that the two C-shaped regions are each connected to the valve disk only at one of its ends. It is also possible that the two C-shaped regions are each fastened with their two ends to the valve disk.

A spring and fastening section which surrounds the valve disk allows a simple and reliable fastening to the metal housing, for example, in that the spring and fastening section is clamped or riveted in the region lying opposite the connection point to the valve disk. As a result, a mounting of the valve disk is achieved on the valve seat in the simplest way. It is also possible to additionally configure a complete outer ring, which is connected to the spring and fastening section in the region lying opposite the connection point to the valve disk and is fully fixed circumferentially on the metal housing.

A further advantageous embodiment of this disclosure provides that the metal body of the valve housing is at least partially sheathed with a plastic casing. The plastic casing is then part of the valve housing. It can leave sections of the metal body uncovered or surround the metal body over its full length. In this case, the plastic casing can form one or more sections of the fluid line, i.e., protrude over the metal body in the flow direction of a gas flowing through the check valve or in the opposite direction.

The spring and fastening section of the valve disk can fastened by means of the plastic casing to the metal body, for example, by clamping between plastic casing and metal body or in which the plastic casing forms one or more rivets, which reach through openings of the spring and fastening section and the metal body. Projections can be configured as rivets in the manufacture of the plastic casing by injection molding, the projections reaching through openings of the spring and fastening section and the metal body and are later caulked hot. The rivet or rivets are then integrally configured with the plastic sheath.

The described combination of a metal body, which forms a thermal coupling surface for an electric heating device and a valve seat, with a plastic casing of the metal body and a valve disk integrally configured with a spring and fastening section valve disk makes it possible to configure the valve seat with a virtually arbitrary shape, in particular circular.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
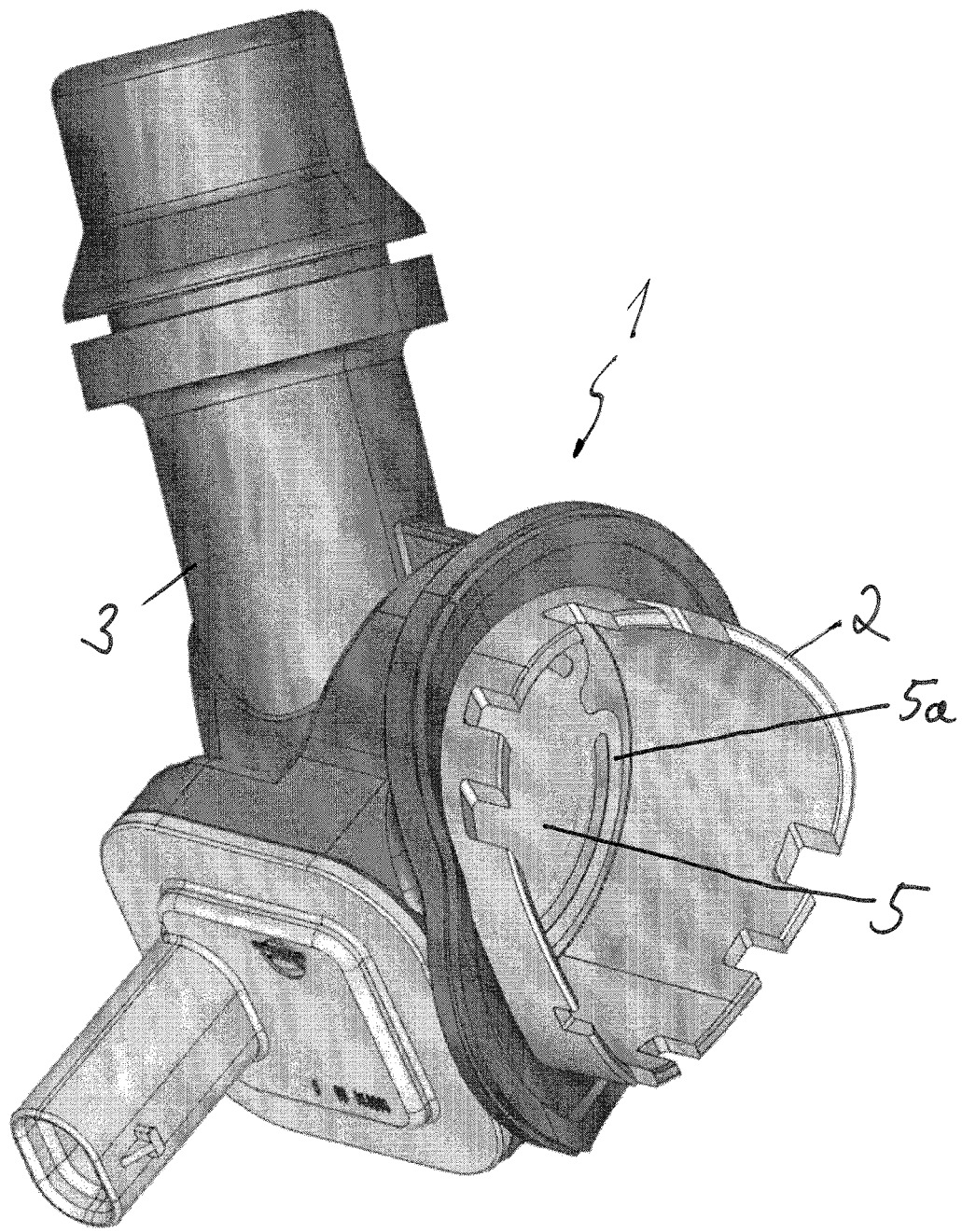
FIG. 1 is an embodiment of a check valve for a line for the venting of a crankcase.
Figure 2:
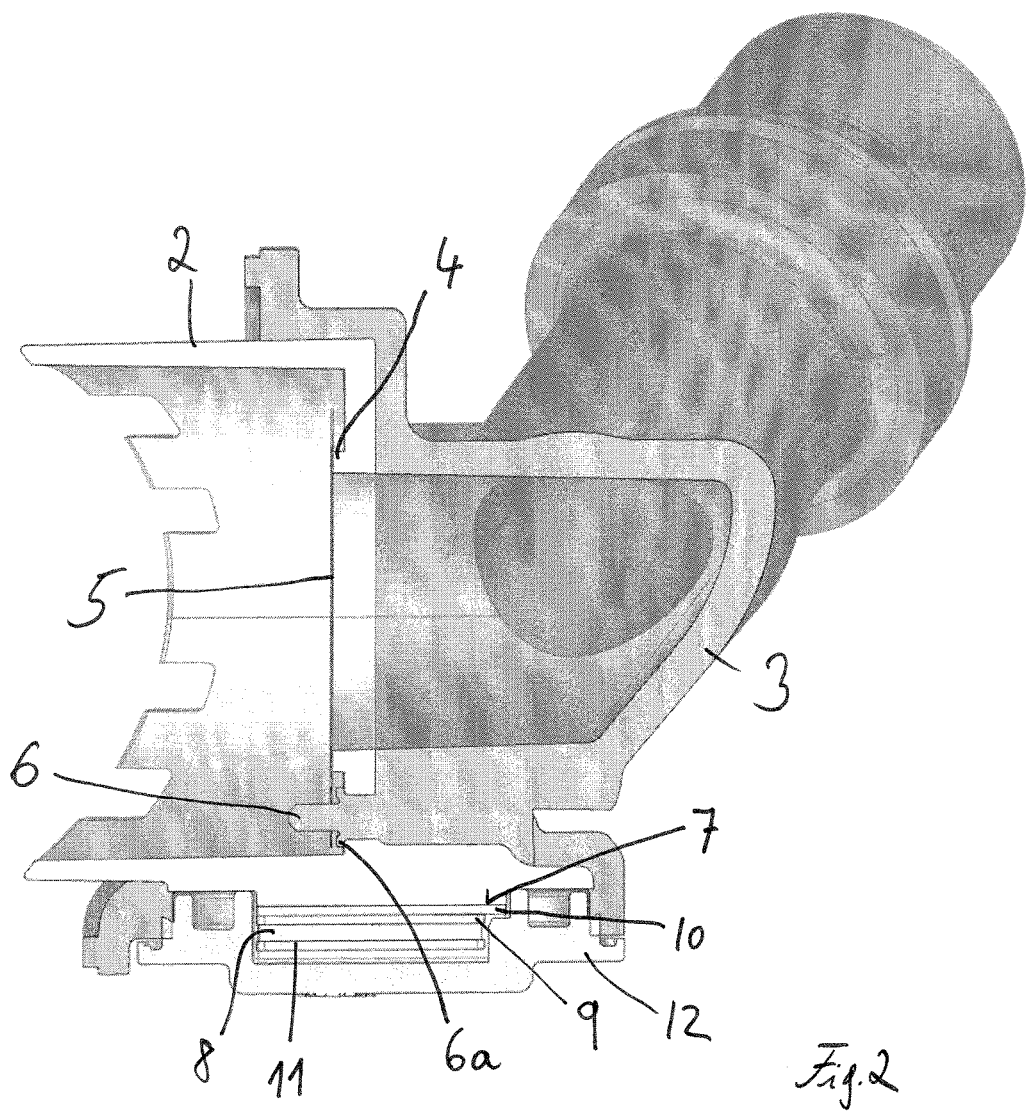
FIG. 2 is a sectional view of FIG. 1 transverse to the valve disk.
Figure 3:
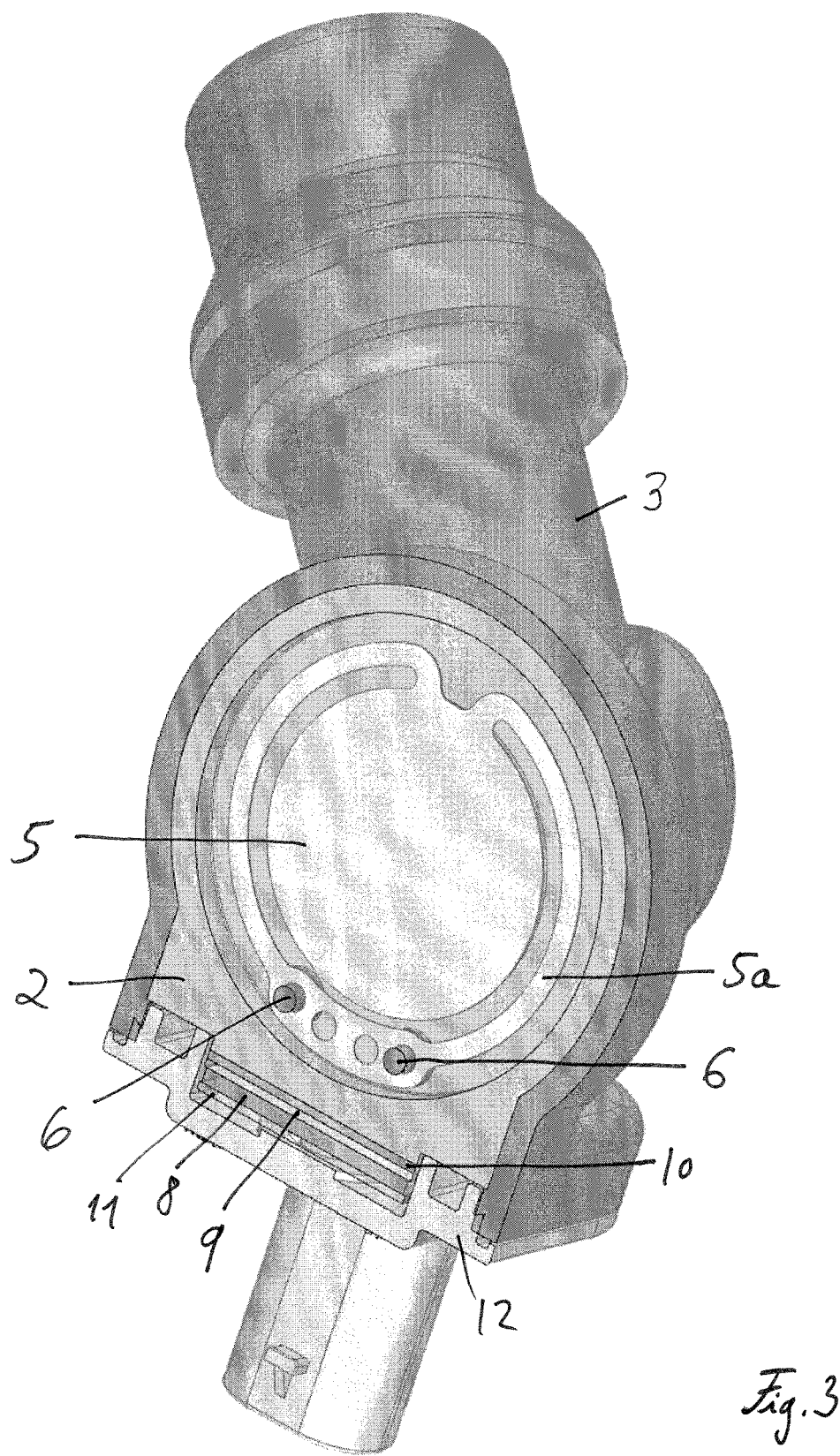
FIG. 3 is a sectional view of FIG. 1 parallel to the valve disk.

The check valve shown in FIGS. 1 to 3 is provided for a fluid line, which carries a gaseous fluid, in a motor vehicle, for example, for a line for venting a crankcase or an exhaust gas recirculation line. The check valve comprises a valve housing 1, which has a metal body 2 and a plastic casing 3, with sheathes the metal body 2 and which forms a section of the fluid line. The metal body 2 forms a pipe section and a valve seat 4, against which a valve disk 5 abuts as a closing member in the closed position. The valve seat 4 may be configured as a ring projection projecting in the direction of flow, as can be seen in FIG. 2.

The valve disk 5 is integrally configured with a spring and fastening section 5a, for example, in which the valve disk 5 and the spring and fastening section 5a are cut out of a piece of sheet metal. The valve disk 5 is fastened to the valve housing 1 via the spring and fastening section 5a (FIG. 3). The spring and fastening section 5a thereby generates a resilient closing force which presses the valve disk 5 against the valve seat 4. In the embodiment shown, the spring and fastening section 5a is configured annular and has two C-shaped halves. The spring and fastening section 5a is connected to the valve disk 5 via one or more webs. This spring and fastening section 5a is fastened to the valve housing 1 only along a part of its circumference. For this purpose, in the embodiment shown, an area opposite the web is fastened to the metal body 2 with two rivets. Alternatively, however, the area lying opposite the web could also be connected to a further outer fastening ring, which is clamped between an annular shoulder of the valve housing 1 and a fastening ring, i.e., is fastened to the valve housing 1 along the entire circumference.

The spring and fastening section 5a is riveted to the metal body 2 of the valve housing 1, in which the plastic casing 3 forms pins 6 or other projections, which reach through openings of the metal body 2 and the spring and fastening section 5a and are caulked. The plastic casing 3 may be, for example, made of a thermoplastic, so that the pins 6 or projections can be caulked hot during riveting.

The rivet or the rivets forms/form an annular shoulder 6a between the metal body 2 and the spring and fastening section respectively, on which the spring and fastening section 5a sits. This annular shoulder 6a has a smaller height than the valve seat 3 seen in the flow direction. During the riveting process, i.e., when the pins 6 are compressed in their axial direction, the spring and fastening section 5a is pressed against this annular shoulder 6a (FIG. 2) and is thereby prestressed. In its closed position, the valve disk 5 therefore abuts against the valve seat 4 with a prestress.

The metal body 2 forms on an outer side a thermal coupling surface 7, on which an electric heating device sits. This thermal coupling surface 7 is configured planar and extends beyond the valve seat 4 both in the flow direction and in the opposite direction. Advantageously, therefore, heat generated by the heating device can be conducted to the valve seat 4 over short distances, so that the valve disk 5, which may have been fixed by ice to the valve seat 4 at the vehicle start, can be melted free very efficiently and quickly and the valve opens in the direction of flow. With a view to a good heat conduction, the metal body 2 may consist, for example, of an aluminum-based alloy.

The electric heating device may comprise a ceramic PTC heating element 8, for example, based on barium titanate. A plate-shaped PTC heating element 8 allows a very good heat coupling to the planar thermal coupling surface 7. The PTC heating element 8 extends in the embodiment shown beyond the valve seat 4 both in the flow direction and in the opposite direction, so that short heat conduction paths are ensured.

The PTC heating element 8 can be electrically contacted by the thermal coupling surface 7. This is not the case, however, in the embodiment shown. As FIG. 2 shows, an electrical contact plate 9 is arranged between the thermal coupling surface 7 and the PTC heating element 8. The contact plate 9 electrically contacts the PTC heating element 8. In this case, an electrical insulation layer 10, for example, plastic film, lies between the coupling surface 7 and the contact plate 9. A second electrical contact plate 11 abuts against the opposite side of the PTC heating element 8.

The heating device may be covered by the plastic casing 3 or, as in the embodiment shown, by a separate cover 12, for example, a further plastic part. The cover 12 is fastened to the plastic casing 3, for example, by latching or welding, and may form the housing of an electrical connector.

Figure 4:
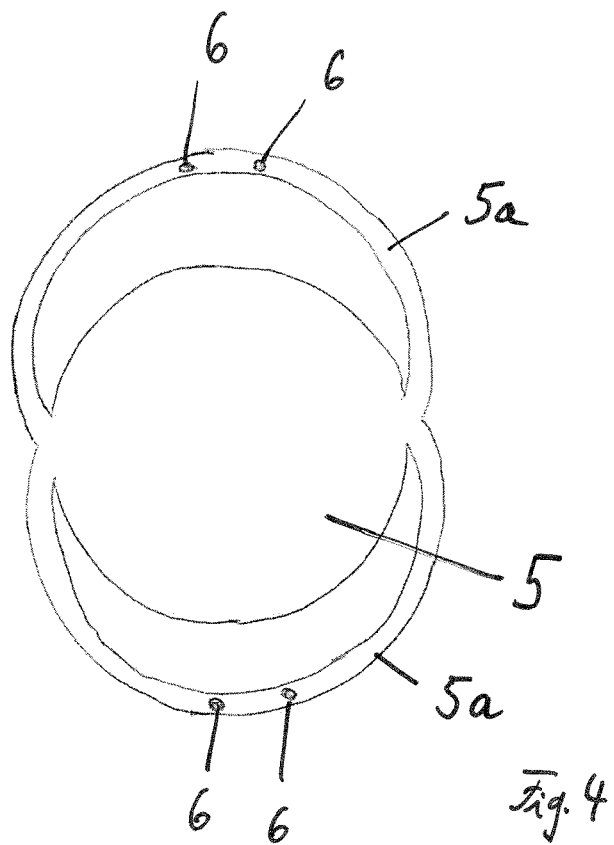
FIG. 4 is a schematic illustration of an alternative embodiment of valve disk with spring and fastening section.

FIG. 4 shows schematically an alternative embodiment of the valve disk 5 with associated spring and fastening section 5a Similar to the above-described embodiment, the spring and fastening section 5a has two C-shaped regions. In contrast to the embodiment described above, however, these two C-shaped regions 5a are connected to the valve disk 5 at two opposite points. Each of the C-shaped regions 5a is riveted to the valve housing near its center. Corresponding projections 6 of the plastic sheath 3 are shown in FIG. 4.

Figure 5:
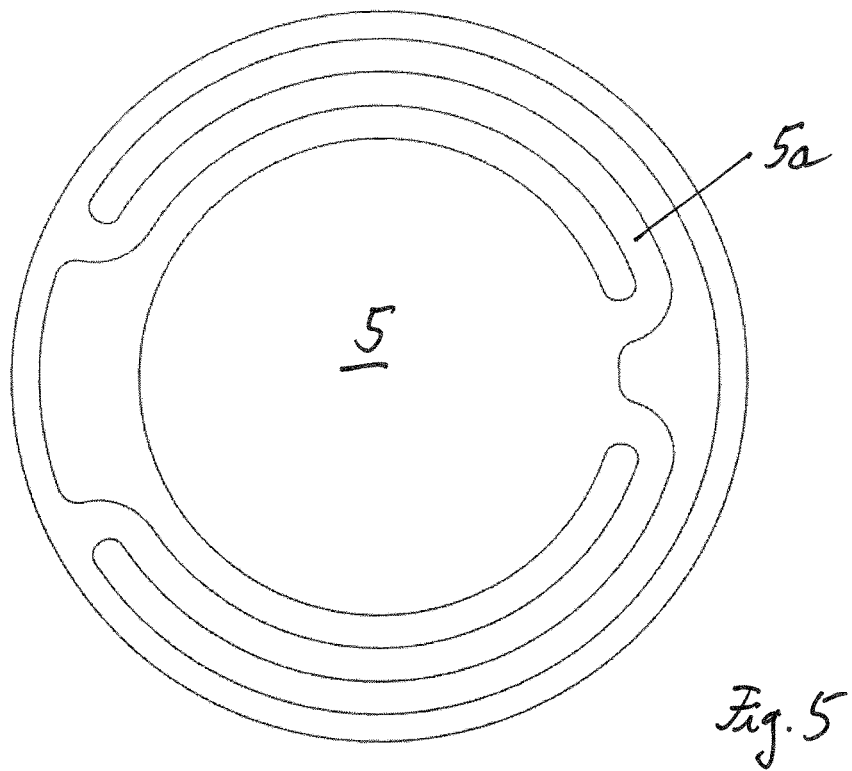
FIG. 5 is a schematic representation of a further alternative embodiment of valve disk with spring and fastening section.

FIG. 5 shows schematically an alternative embodiment of the valve disk 5 with associated spring and fastening section 5a. This embodiment is similar to the example shown in FIG. 3 and differs therefrom essentially in that a ring which surrounds the two C-shaped regions is added to the fastening section 5a formed from two C-shaped regions in FIG. 3. This ring can be fastened by riveting or clamping on the valve housing.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS 1 valve housing
2 metal bodies
3 plastic casing
4 valve seat
5 valve disk
5a spring and fastening section
6 pin
6a annular shoulder
7 coupling surface
8 PTC heating element
9 contact plate
10 insulation layer
11 contact plate
12 cover

What is claimed is:

1. A check valve for a fluid line in a motor vehicle for use in venting a crankcase, the check valve comprising:
   a valve housing that has a valve seat;
   a valve disk, which abuts against the valve seat in a closed position; and
   an electric heater configured for heating the valve housing;
   wherein the valve disk comprises a spring and fastening section that is fastened to the valve housing and generates a closing force which presses the valve disk against the valve seat, said valve disk and the spring and fastening section being a single piece; and
   wherein the valve housing has a metal body which forms the valve seat, the metal body forming on an outside thereof a thermal coupling surface, on which the electric heating device sits and which together with the electric heating device extends beyond the valve seat both in the fluid flow direction and opposite the fluid flow direction.

2. The check valve according to claim 1, wherein the spring and fastening section is fastened to the valve housing by one or more rivets.

3. The check valve according to claim 1, wherein the metal body is at least partially sheathed with a plastic casing.

4. The check valve according to claim 3, wherein the valve disk is fastened to the valve housing by means of the casing.

5. The check valve according to claim 2, wherein the rivet or the rivets is/are configured integrally with a plastic casing that at least partially sheaths the metal body.

6. The check valve according to claim 5, wherein the rivet or the rivets reaches/reach through both openings of the metal body and the spring and fastening section.

7. The check valve according to claim 6, wherein the rivet or the rivets each form an annular shoulder between the metal body and the spring and fastening section of the valve disk, on which the spring and fastening section sits.

8. The check valve according to claim 3, wherein the plastic casing forms a section of the fluid line.

9. The check valve according to claim 1, wherein the valve seat is configured as a ring projecting in the flow direction.

10. The check valve according to claim 7, wherein the annular shoulder has a smaller height than the valve seat as seen in the flow direction, so that the valve disk abuts against the valve seat with a prestress in the closed position.

* * * * *